US012773710B2

(12) United States Patent
Fisher et al.

(10) Patent No.: US 12,773,710 B2
(45) Date of Patent: Oct. 27, 2026

(54) CLEAN AGENT SYSTEM NOZZLE WITH PRESSURE CONTROLLED COVER PLATE

(71) Applicant: Tyco Fire Products LP, Lansdale, PA (US)

(72) Inventors: Michael John Fisher, Marinette, WI (US); Karl Maas, Jr., Peshtigo, WI (US); Adam Staszak, Marinette, WI (US); Vimal Ayyappan, Bangalore (IN)

(73) Assignee: Tyco Fire Products LP, Cranston, RI (US)

( * ) Notice: Subject to any disclaimer, the term of this patent is extended or adjusted under 35 U.S.C. 154(b) by 468 days.

(21) Appl. No.: 18/006,656

(22) PCT Filed: Oct. 5, 2021

(86) PCT No.: PCT/IB2021/059139
§ 371 (c)(1),
(2) Date: Jan. 24, 2023

(87) PCT Pub. No.: WO2022/074568
PCT Pub. Date: Apr. 14, 2022

(65) Prior Publication Data

US 2023/0278064 A1 Sep. 7, 2023

Related U.S. Application Data

(60) Provisional application No. 63/088,022, filed on Oct. 6, 2020.

(51) Int. Cl.
*B05B 15/74* (2018.01)
*A62C 35/68* (2006.01)

(52) U.S. Cl.
CPC .............. *B05B 15/74* (2018.02); *A62C 35/68* (2013.01)

(58) Field of Classification Search
CPC ........... A62C 3/006; A62C 3/16; A62C 31/02; A62C 31/05; A62C 31/28; A62C 35/62;
(Continued)

(56) References Cited

U.S. PATENT DOCUMENTS 1,863,919 A * 6/1932 Brooks .................. B05B 15/74
137/305
2,493,982 A * 1/1950 Lee ...................... A62C 31/005
239/DIG. 13

(Continued)

FOREIGN PATENT DOCUMENTS

JP 2004-141647 A 5/2004
KR 101055583 B1 8/2011

(Continued)

OTHER PUBLICATIONS

Korean Intellectual Property Office; International Search Report and Written Opinion; International Patent Application No. PCT/IB2021/059139; Dec. 29, 2021; 9 pages.

*Primary Examiner* — Darren W Gorman
(74) *Attorney, Agent, or Firm* — Foley & Lardner LLP

(57) ABSTRACT

A nozzle assembly configured to selectively provide fire suppression agent to a space. The nozzle assembly includes a cover, a cap releasably coupled to the cover to define a cavity, and a nozzle head received within the cavity. The nozzle head is configured to provide the fire suppression agent to a hazard area. The cap is released from the cover in response to a pressure formed by the release of fire suppression agent by the nozzle head into the cavity.

20 Claims, 7 Drawing Sheets

(58) Field of Classification Search
CPC ......... A62C 35/68; A62C 37/09; A62C 37/44; A62C 37/48; A62C 99/0018; B05B 15/74
See application file for complete search history.

(56) References Cited

U.S. PATENT DOCUMENTS

| | | | | |
|---|---|---|---|---|
| 5,020,601 | A | 6/1991 | Retzloff et al. | |
| 5,199,500 | A * | 4/1993 | Norman | A62C 31/28 239/104 |
| 5,501,282 | A * | 3/1996 | Sundholm | A62C 31/02 169/37 |
| 7,389,827 | B2 * | 6/2008 | Biehl | A62C 31/28 169/65 |
| 2007/0125880 | A1 * | 6/2007 | Palle | A62C 31/05 239/398 |
| 2009/0218109 | A1 | 9/2009 | Sato | |
| 2017/0304663 | A1 * | 10/2017 | Khazova | B05B 1/005 |
| 2022/0355328 | A1 * | 11/2022 | Rönnfeldt | A62C 31/005 |

FOREIGN PATENT DOCUMENTS

| | | | | |
|---|---|---|---|---|
| KR | 101855393 | B1 | 5/2018 | |
| WO | WO-8303064 | A1 * | 9/1983 | A62C 37/09 |
| WO | WO-2007113483 | A1 * | 10/2007 | B05B 1/14 |

* cited by examiner

CLEAN AGENT SYSTEM NOZZLE WITH PRESSURE CONTROLLED COVER PLATE

CROSS-REFERENCE TO RELATED PATENT APPLICATION

This application claims the benefit of and priority to U.S. Patent Application No. 63/088,022, filed Oct. 6, 2020, the entire disclosure of which is hereby incorporated by reference herein.

BACKGROUND

Fire suppression systems are commonly used to protect an area and objects within the area from fire. Fire suppression systems can be activated manually or automatically in response to an indication that a fire may be present nearby (e.g., an increase in ambient temperature beyond a predetermined threshold value, etc.). Once activated, fire suppression systems spread a fire suppression agent throughout the area. The fire suppression agent then extinguishes or prevents the growth of the fire.

SUMMARY

One aspect of the present disclosure relates to a nozzle assembly configured to selectively provide fire suppression agent to a space. The nozzle assembly includes a cover, a cap releasably coupled to the cover to define a cavity, and a nozzle head received within the cavity. The nozzle head is configured to provide the fire suppression agent to a hazard area. The cap is released from the cover in response to a pressure formed by the release of fire suppression agent by the nozzle head into the cavity.

In various embodiments, the nozzle head is in fluid communication with the hazard area after the cap is decoupled from the cover. In some embodiments, the nozzle head is configured to release the fire suppression agent from within the cover. In other embodiments, the nozzle head is positioned behind a surface relative to the cap and the cap is positioned in front of the surface. In yet other embodiments, the fire suppression agent is an inert gas. In various embodiments, the cap is coupled to the cover via an adhesive. In some embodiments, the cap is coupled to the cover via a friction fitting.

Another aspect of the present disclosure relates to a nozzle assembly configured to selectively provide fire suppression agent to a space. The nozzle assembly includes a pipe coupling assembly structured to change in length, a nozzle head coupled to the pipe coupling assembly, a cover, and a cap releasably coupled to the cover and defining a cavity therebetween. In an unactuated configuration, the nozzle head is received within the cavity and not visible from within the space. In an actuated configuration, the pipe coupling assembly increases in length and the nozzle head extends at least partially out from the cavity and is visible from within the space.

In various embodiments, the pipe coupling assembly includes an outer pipe portion and an inner pipe portion slidably coupled to the outer pipe portion. In some embodiments, the outer pipe portion slides relative to the inner pipe portion due to the fire suppression agent flowing through. In other embodiments, the outer pipe portion includes a first flange and the inner pipe portion includes a second flange, wherein engagement of the first flange and the second flange limits a range of movement of the inner pipe portion relative to the outer pipe portion. In yet other embodiments, the outer pipe portion, the inner pipe portion, the first flange, and the second flange define a cavity including a fluid configured to dampen movement of the inner pipe portion relative to the outer pipe portion upon release of the fire suppression agent from the nozzle head. In various embodiments, a first seal is positioned on the first flange and a second seal is positioned on the second flange to form a fluid seal between the first flange and the second flange. In some embodiments, the nozzle head is spaced approximately 0-12 inches from the cover in the actuated configuration. In other embodiments, the nozzle head is positioned within the cavity and behind a surface in an unactuated configuration, and outside of the cavity and in front of the surface in the actuated configuration. In yet other embodiments, the cap is released from the cover by force on the cap formed by a pressure within the cavity due to a release of the fire suppression agent. In various embodiments, the cap is released from the cover by a force exerted on the cap due to movement of the nozzle head. In some embodiments, the cap is fixedly coupled to the nozzle head. In yet other embodiments, the assembly further includes a hinge rotatably coupling the cap to the cover.

Yet another aspect of the present disclosure relates to a method for releasing a fire suppression agent from a nozzle assembly into a space. The method comprising coupling the nozzle assembly to a distribution piping. The nozzle assembly comprises a nozzle, a cover, a cap, and a pipe coupling assembly, the pipe coupling assembly being partially translatable relative to the distribution piping. The method also comprises supplying a cavity defined between the cover and the cap with the fire suppression agent via the distribution piping, forming a pressure within the cavity due to introduction of fire suppression agent, decoupling the cap from the cover in response to a threshold force exerted on the cap by the pressure, moving the nozzle relative out of the cavity to an actuated position, and releasing fire suppression agent into the space via the nozzle while in the actuated position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Overview

Figure 1:
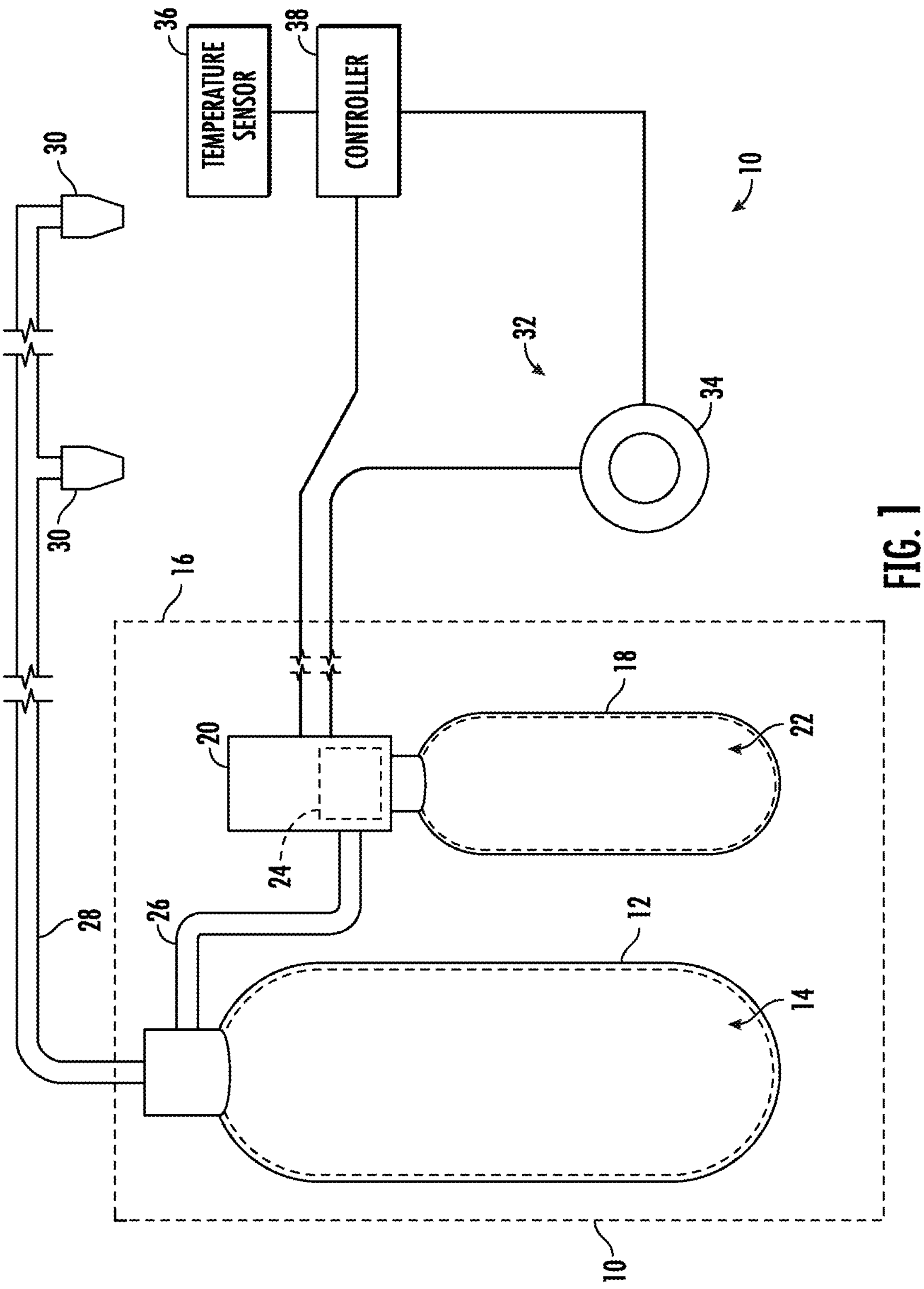
FIG. 1 is an illustration of a fire suppression system according to an exemplary embodiment.
Figure 2:
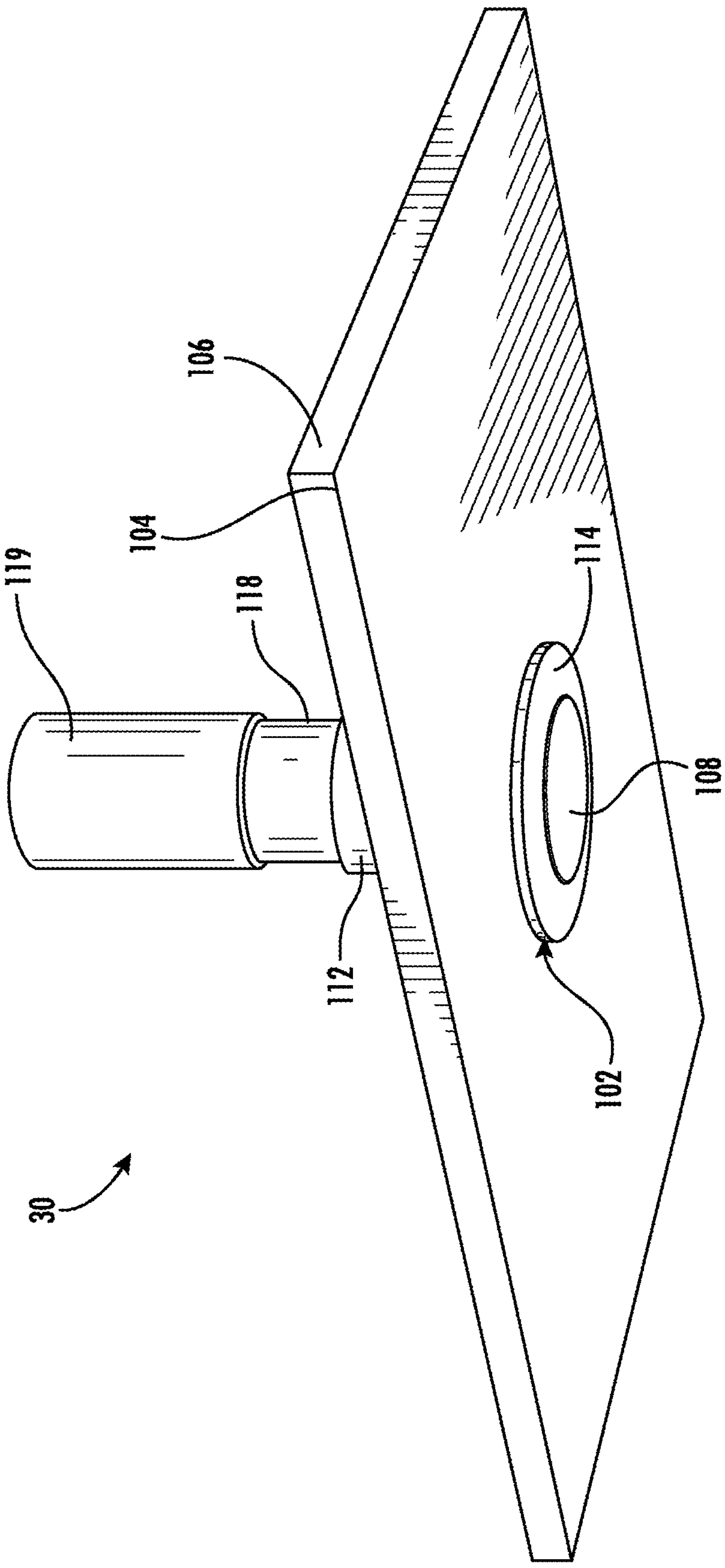
FIG. 2 is a perspective view of a nozzle assembly in a second flange unactuated configuration according to an exemplary embodiment.
Figure 3:
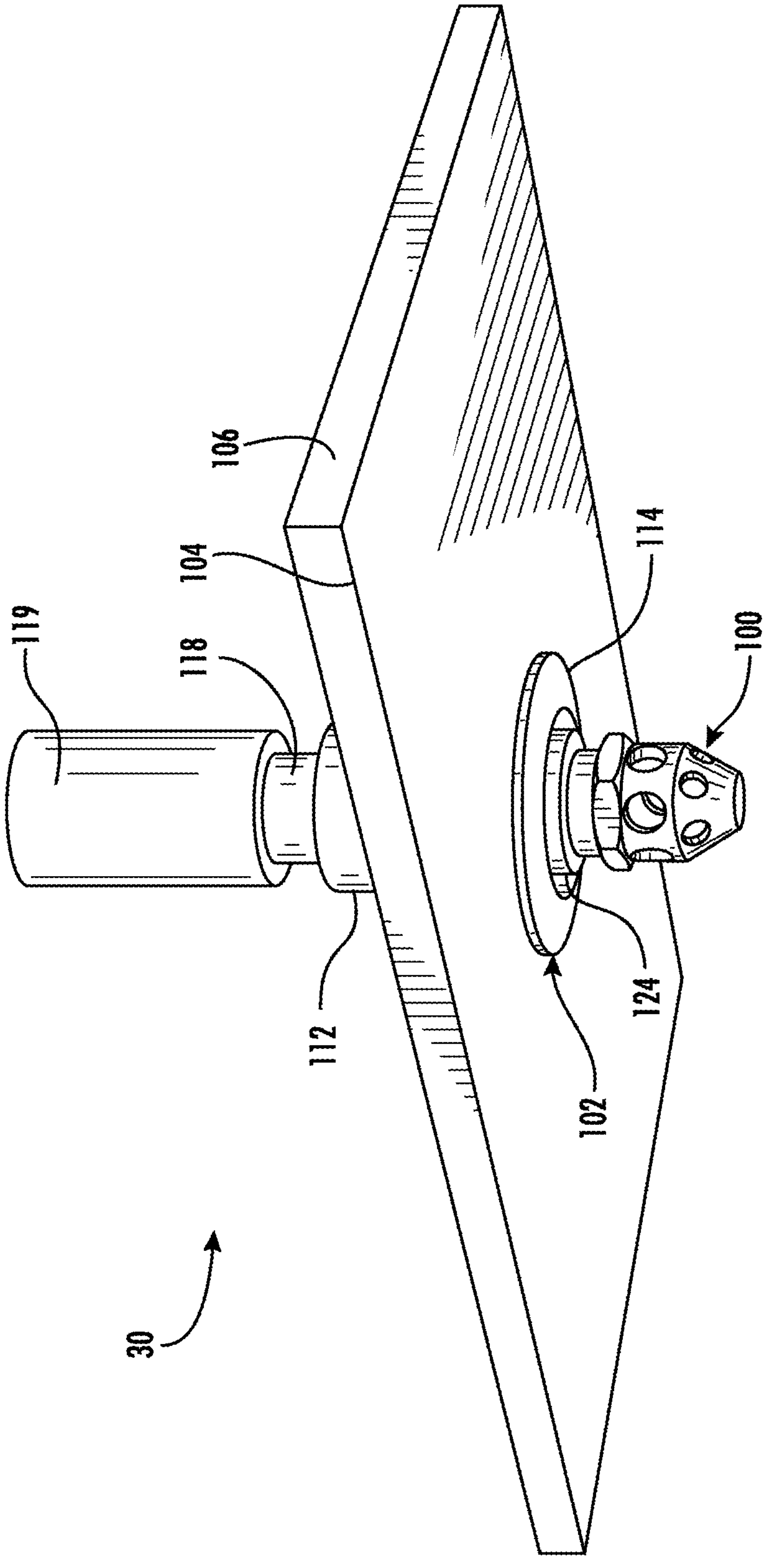
FIG. 3 is a perspective view of the nozzle assembly of FIG. 1 in an actuated configuration according to an exemplary embodiment.
Figure 4:
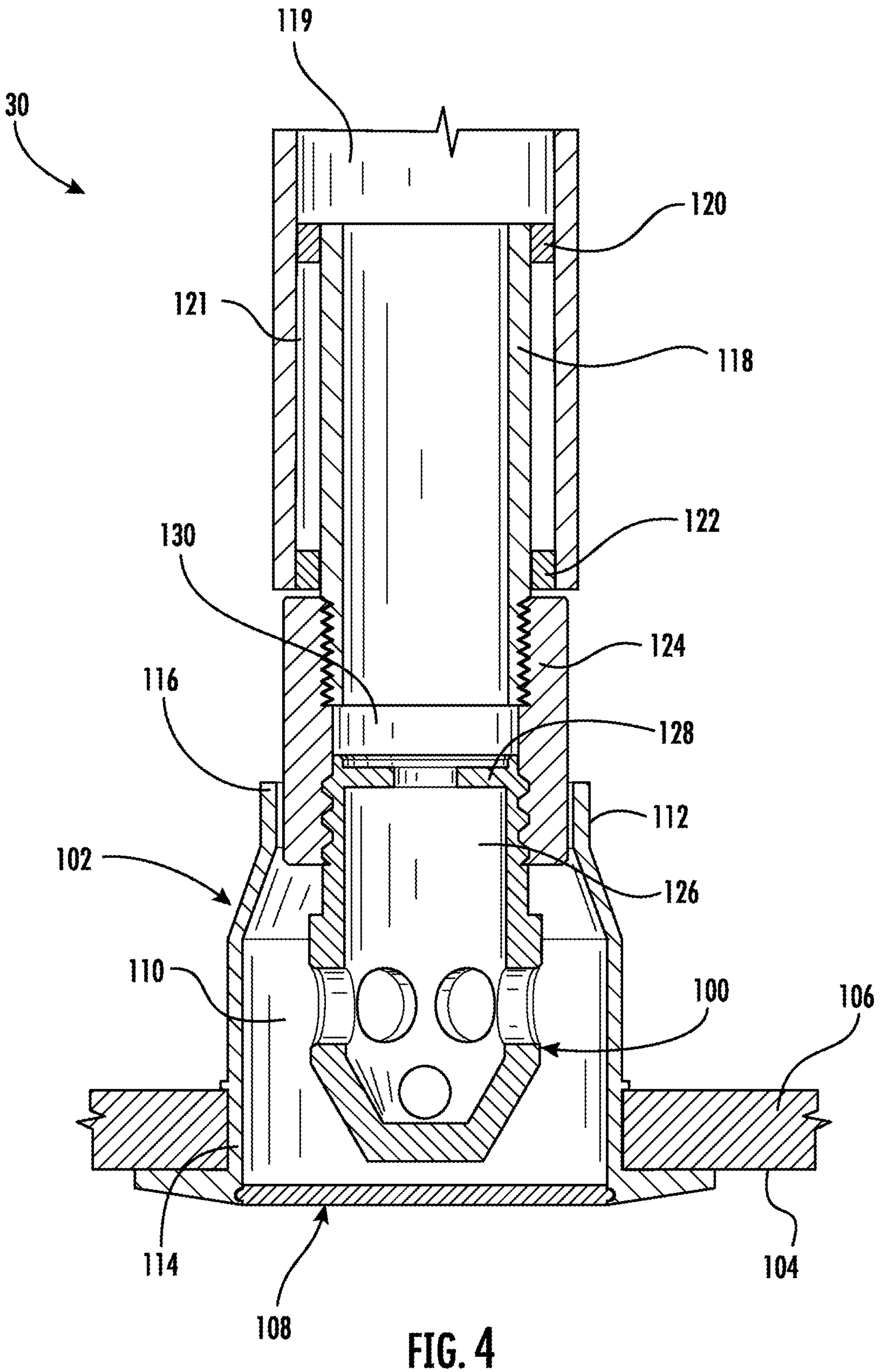
FIG. 4 is a partial section view of the nozzle assembly of FIG. 1 in an unactuated configuration according to an exemplary embodiment.
Figure 5:
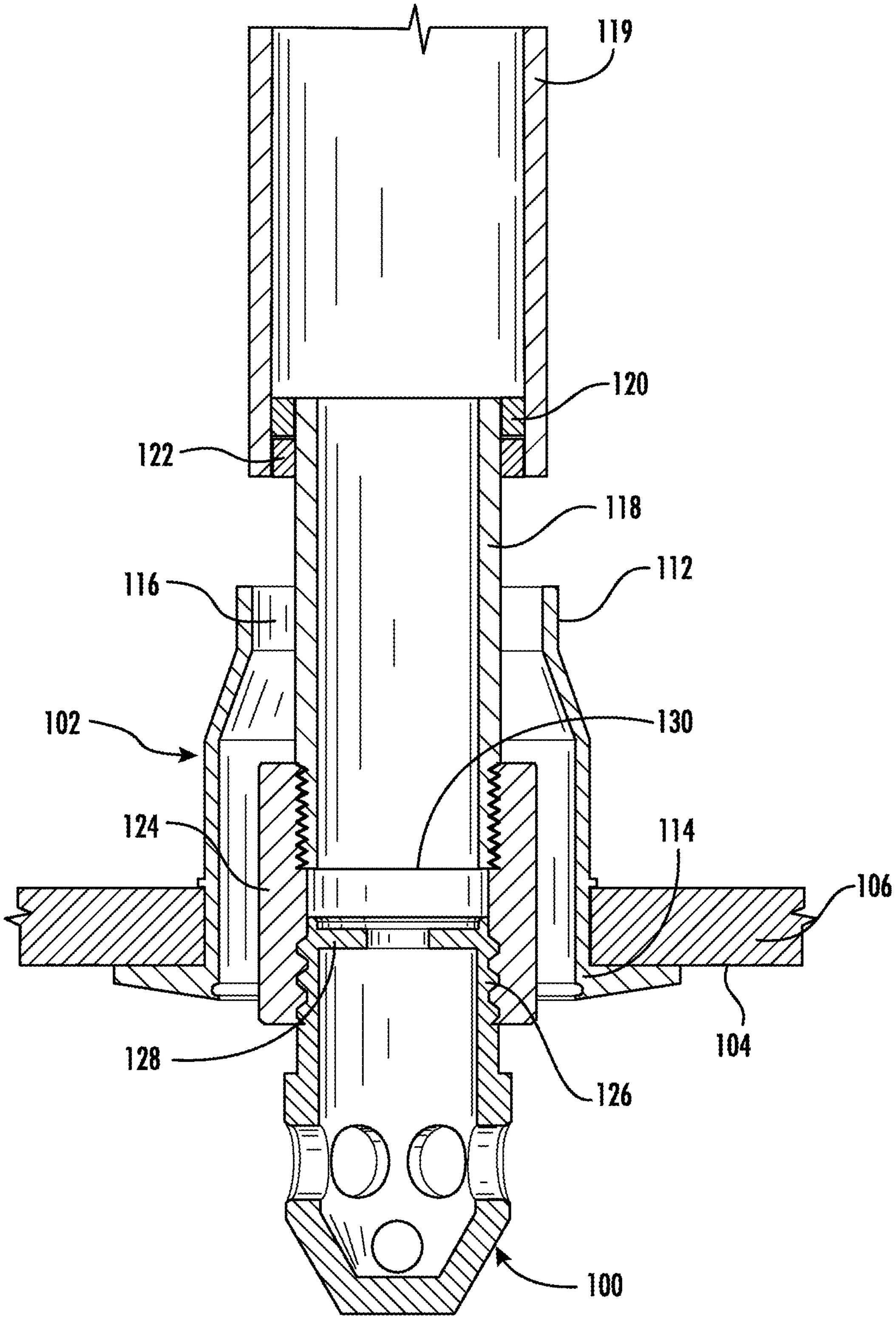
FIG. 5 is a partial section view of the nozzle assembly of FIG. 1 in an actuated configuration according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Hazard areas (e.g., data centers, etc.) may have circuitry or other electronics that can become heated and cause components (e.g., wire casings, plastic, etc.) to ignite, which can lead to fires in the hazard areas. Accordingly, hazard areas are often outfitted with fire suppression systems to combat such fires. These fire suppression systems generally include nozzles that are configured to supply a fire suppression agent (e.g., clean agent, etc.) toward a hazard (e.g., a server rack, a memory storage device, etc.) in response to detection of a fire to suppress the fire.

The nozzles may be positioned within, mounted to, or disposed adjacent to a wall, a ceiling, or a floor of a room. In some implementations of the fire suppression system, it may be beneficial to limit visibility of the nozzles until activation of the fire suppression system. For example, limiting visibility can improve the appearance of the room. In various implementations, each nozzle may be positioned behind a surface of the wall, the floor, or the ceiling, and may include a cover positioned on the surface of the wall, the floor, or the ceiling. A cavity, which is defined between each cover and nozzle, can fill with a gas (e.g., an activation gas, fire suppression agent, an inert gas, etc.) in response to activation of the fire suppression system. The gas may fill the cavity and create a pressure therein. Once a high enough pressure is reached, a cap may be forced from the cover, revealing the nozzle and allowing the nozzle to release fire suppression agent into the room.

Referring generally to the figures, fire suppression systems are configured for use in a hazard area (e.g., a data center, etc.). Fire suppression systems include components that suppress fire within the hazard area. One or more nozzles within the fire suppression systems are configured to release a fire suppression agent on, near, or around an element (e.g., a server bank, etc.) in the hazard area. The nozzles are fluidly coupled to an agent tank, which is configured to contain a quantity of fire suppression agent. A release assembly is coupled to the agent tank to facilitate the release of fire suppression agent from the agent tank via an actuator and a cartridge of expellant gas. The actuator is configured to facilitate the release of the expellant gas from the cartridge into the agent tank.

The fire suppression system includes a nozzle assembly configured to limit visibility of each nozzle in the fire suppression system before activation of the fire suppression system. The nozzle assembly may include a cover that couples to a surface (e.g., a wall, a floor, a ceiling, etc.) of a room. A cavity is defined by the cover. The cover includes a cap configured to decouple from the cover during activation of the fire suppression system and allow visibility of the nozzle assembly and release of fire suppression agent from the nozzle into the room.

Fire Suppression System

Referring to FIG. 1, a fire suppression system 10 is shown according to at least one embodiment. The fire suppression system 10 can be configured to suppress a fire in a stationary application (e.g., a data center, kitchen, etc.) or in a mobile application (e.g., a truck, mobile container, etc.). The fire suppression system 10 can utilize various fire suppression agents (e.g., gas, foam, water, etc.) to suppress a fire. The fire suppression system 10 is configured to activate (e.g., release the fire suppression agent, etc.) if a fire condition is detected. In some embodiments, the fire suppression system 10 can be configured to release a large quantity of agent over a short duration of time. In other embodiments, the fire suppression system 10 can be configured to release a larger quantity of agent over a first duration, then release a smaller quantity over a second longer duration to prevent the fire from reigniting. The fire suppression system 10 can be activated mechanically or electronically.

In at least one embodiment, the fire suppression system 10 includes an agent tank 12. The agent tank 12 defines an internal volume 14, which contains a quantity of fire suppression agent (e.g., gas, foam, water, etc.). In some embodiments, the agent tank 12 can be positioned in close proximity to a hazard area to facilitate rapid activation of the fire suppression system 10. In other embodiments, the agent tank 12 can be remotely positioned relative to the hazard area to facilitate more accessibility to the agent tanks 12. The agent tank 12 (or multiple agent tanks 12) may be coupled to a release assembly 16, which is configured to facilitate the release of fire suppression agent from the agent tank 12 (or from multiple agent tanks 12 within the fire suppression system 10). The release assembly 16 includes a cartridge 18 and an actuator 20, which is removably coupled to the agent tank 12. The cartridge 18 defines an internal volume 22 configured to contain a quantity of release gas. The actuator 20 couples to the cartridge 18 and includes a mechanism 24 (e.g., a pin, a needle, a blade, etc.) configured to penetrate the internal volume 22 of the cartridge 18. The release assembly 16 couples to a release conduit or piping 26, which fluidly couples the internal volume 22 of the cartridge 18 to the internal volume 14 of the agent tank 12, such that when the actuator 20 penetrates the internal volume 22 of the cartridge 18, the release gas can flow from the cartridge 18 to the internal volume 14 of the agent tank 12.

The fire suppression system 10 also includes a distribution conduit or piping 28 (e.g., tubing, etc.) coupled to the agent tank 12. In some embodiments, the distribution piping 28 and the agent tank 12 can be removably coupled to facilitate removal of the agent tank 12 from the fire suppression system 10. The distribution piping 28 can be configured to direct the fire suppression agent released from the agent tank 12 to one or more nozzle assemblies 30. The nozzle assemblies 30 can be coupled to distal ends (e.g., ends open to an ambient environment, etc.) of the distribution piping 28, and are and configured to release fire suppression agent into the ambient environment. The nozzle assemblies 30 are directed (e.g., aimed, etc.) such that the fire suppression agent, when released into the ambient environment, releases towards a hazard area (e.g., an area with a higher chance of fire, etc.) to suppress a fire within the hazard area.

The fire suppression system 10 can be configured to activate automatically and/or manually. In embodiments where the fire suppression system 10 is configured to activate manually, the fire suppression system 10 includes a manual activation device 32. The manual activation device 32 may include a button 34, a knob, a lever, a switch, or another type of user interface that is configured to receive an input from a user. The manual activation device 32 can be located in close proximity to the hazard area, or the manual activation device 32 can be remotely located relative to the hazard area. In some embodiments, the fire suppression system 10 includes at least one manual activation device 32 located in close proximity to the hazard area and at least one manual activation device 32 located remote from the hazard area. In the embodiment of the fire suppression system 10 configured to activate electronically, the fire suppression system 10 includes one or more thermal detectors 36. The thermal detectors 36 can be located in close proximity to the hazard area, and configured to detect whether a fire has ignited within the hazard area (i.e., based on a threshold temperature, a rise in temperature, etc.). The fire suppression system 10 can include a controller 38 configured to receive signals (e.g., electrical, mechanical, pneumatic, etc.) from the thermal detectors 36 and/or the manual activation device 32 and send signals to the actuator 20. In some embodiments, the thermal detectors 36 and/or the manual activation device 32 are configured to send signals directly to the actuator 20.

The controller 38 is configured to send and receive signals within the fire suppression system 10. The controller 38 can be directly coupled to the manual activation device 32, the actuator 20 of the release assembly 16, and/or the thermal detectors 36. In some embodiments, the controller 38 includes a processor and a memory. In such embodiments, the controller 38 may be configured to provide electrical activation signals to the actuator 20 (or to each actuator 20 if there are more than one actuators 20). In some embodiments, the controller 38 is configured to electronically sense (e.g., with a strain gauge, with a switch, etc.) a tensile force (i.e., a tensile force applied by the actuator 20).

Nozzle Assembly

Referring to FIGS. 2-7, embodiments of the nozzle assembly 30 are shown in greater detail, according to various embodiments. As described above, the nozzle assembly 30 is configured to activate in response to activation of the fire suppression system 10. Referring to FIGS. 2-5, in one embodiment, the nozzle assembly 30 includes a nozzle head 100 fluidly coupled to the distribution piping 28. The nozzle assembly 30 includes a cover 102 (e.g., a housing, etc.), positioned on or near a surface 104 of a wall 106 (e.g., a ceiling, a floor, etc.) or other structure within a space (e.g., a room, etc.). The nozzle assembly 30 also includes a cap 108 (e.g., a lid, etc.) selectively coupled to the cover 102 and positioned to define an outermost surface of the nozzle assembly 30. The nozzle assembly 30 is configured to be in either an actuated configuration or an unactuated configuration. When the nozzle assembly 30 is in the unactuated configuration, the nozzle head 100 is positioned behind the cap 108 and is obscured from view (i.e., not visible by users within the space). The cap 108 is coupled to the cover 102 in the unactuated configuration. A cavity 110 is defined between the cover 102 and the cap 108. In an actuated configuration, the nozzle head 100 may be positioned in front of the surface 104 or may be positioned behind the surface 104. The cap 108 decouples from the cover 102 to allow fluid communication between the cavity 110 and an ambient environment within the space. For example, in some embodiments, once actuated, the nozzle head 100 releases a fire suppression agent (e.g., an inert gas, etc.) into the space. In some embodiments, the cap 108 is fixedly coupled to a distal end of the nozzle head 100. In some embodiments, the cap 108 is rotatably coupled to the cover 102 via a hinge. Accordingly, when the cap 108 is released from the cover 102, the cap 108 remains coupled to the cover 102 via the hinge and allows the nozzle head 100 to be visible through the cover 102.

In some embodiments, the cover 102 is configured to extend at least partially behind the surface 104. The cover 102 includes an inlet end 112 and an outlet end 114. The inlet end 112 is positioned behind the surface 104 relative to the hazard area. The outlet end 114 is positioned in front of the surface 104, relative to the hazard area. An aperture 116, which is formed by the cover 102, extends from the inlet end 112 to the outlet end 114. At the inlet end 112, the aperture 116 may have a smaller diameter than at the outlet end 114. In some embodiments, the aperture 116 has the same diameter at the inlet end 112 and the outlet end 114. The cap 108 is positioned on the outlet end 114 of the cover 102. The cap 108 has a diameter that is equal to or greater than a diameter of the aperture 116 at the outlet end 114 to limit fluid communication between the outlet end 114 and an ambient environment within the space. The cap 108 may be coupled to the cover 102 via adhesive, pressure, snap fit, friction fit, or another method of coupling. In some embodiments, the nozzle head 100 is coupled to the cap 108. The nozzle head 100 is positioned between the inlet end 112 and the outlet end 114 of the cover 102. In some embodiments, the distribution piping 28 extends into the aperture 116. The aperture 116 has a diameter at the inlet end 112 similar to a diameter of the distribution piping 28 to form a fluid seal from an ambient environment at the inlet end 112. The cavity 110 is defined on the outlet end 114 of the cover 102 by the cap 108 and the cover 102. The cavity 110 is defined on the inlet end 112 of the cover 102 by the cover 102, the nozzle head 100, and/or distribution piping 28. The cavity 110 can receive gas (e.g., actuation gas, fire suppression agent, etc.) from the nozzle head 100. The gas may be released from the agent tank 12 or from another source of gas.

Still referring to FIGS. 2-5, the nozzle assembly 30 includes an inner pipe portion or drop pipe 118 and an outer pipe portion 119. The drop pipe 118 and the outer pipe portion 119 interface to define a pipe coupling assembly. The outer pipe portion 119 couples to the distribution piping 28 during installation of the nozzle assembly 30 into the fire suppression system 10. The drop pipe 118 may have a smaller outer diameter than an inner diameter of the outer pipe portion 119. The drop pipe 118 extends into the outer pipe portion 119. The drop pipe 118 may be configured to displace relative to the outer pipe portion 119 such that the pipe coupling assembly changes in length. In various embodiments, the drop pipe 118 may be slidably coupled to the outer pipe portion 119 such that the drop pipe 118 may slide relative to the outer pipe portion 119 when the nozzle assembly 30 is actuated. The drop pipe 118 can include an outer flange 120. The outer flange 120 is positioned on an external side the drop pipe 118, and may be provided at an end portion of the drop pipe 118. The outer pipe portion 119 includes an inner flange 122. The inner flange 122 is positioned on an internal side at an end of the outer pipe portion 119. The inner flange 122 is structured to interface or engage with the outer flange 120 and limit further movement of the drop pipe 118 out of the outer pipe portion 119. A cavity 121 is defined between the inner flange 122, the outer flange 120, the drop pipe 118, and the outer pipe portion 119. The cavity 121 may be filled with a fluid (e.g., gas, liquid, etc.) In some embodiments, a seal (e.g., an O-ring, etc.) is positioned on each of or between the inner flange 122 and the outer flange 120 to form a fluid seal between the drop pipe 118 and the outer pipe portion 119. In some embodiments, a fluid in the cavity 121 is compressed during activation to form a fluid compression to dampen the descent of the drop pipe 118 upon actuation. For example, as fire suppression agent is release toward and through nozzle head 100, the drop pipe 118 is forced downward relative to outer pipe portion 119 (thereby lengthening the pipe coupling assembly). As the drop pipe 118 moves, the volume of the cavity 121 decreases, and a fluid pressure generated by the fluid due to a reduction of volume dampens the descent of the drop pipe 118. In various embodiments, sliding of the drop pipe 118 relative to the outer pipe portion 119 is facilitated by or is responsive to flow of fire suppression agent flowing through the nozzle assembly 30 (i.e., in response to detection of a fire hazard within the space).

An interfacing pipe 124 may also be included in the pipe coupling assembly to couple the nozzle head 100 to the drop pipe 118. An inlet end 126 of the nozzle head 100 interfaces with an outlet end 130 of the drop pipe 118. The interfacing pipe 124 may have a larger diameter than the drop pipe 118 and/or the nozzle head 100. The interfacing pipe 124 may be a similar diameter to the inlet end 112 of the cover 102 to form a fluid seal between the interfacing pipe 124 and the cover 102. A portion of the inlet end 126 of the nozzle head 100 may extend into an interfacing aperture 116 defined by the interfacing pipe 124 (i.e., the pipe coupling assembly lengthens). A portion of the outlet end 130 of the drop pipe 118 may extend into the interfacing aperture 116 defined by the interfacing pipe 124. The interfacing pipe 124 may be coupled to the nozzle head 100 and the drop pipe 118 via adhesive, pressure, friction, or another form of coupling. In some embodiments, an orifice plate 128 is positioned between the nozzle head 100 and the drop pipe 118. The orifice plate 128 may be configured to increase or decrease flow velocity of gas and/or fire suppression agent flowing through the orifice plate 128.

In an unactuated configuration, the nozzle head 100 is covered by the cap 108 and the cover 102 and behind a surface 104 of a wall 106. The cavity 110 is defined by the cover 102, the cap 108, the nozzle head 100, and in some embodiments, the interfacing pipe 124. The cavity 110 is fluidly sealed from an ambient environment (i.e., within the space) in the unactuated configuration. In some embodiments, the interfacing pipe 124 interfaces with (e.g., contacts, etc.) distribution piping 28. The drop pipe 118 extends at a maximum distance into the outer pipe portion 119 in this unactuated configuration.

In an actuated configuration, the nozzle head 100 is visible. In some embodiments, the nozzle head 100 extends below the cover 102 and the surface 104. For example, in some embodiments, the nozzle head 100 is approximately 0-12 inches below the surface 104. The cavity 110 is open to the ambient environment from at least one of the inlet end 112 and the outlet end 114. In some embodiments, the cap 108 is decoupled from the cover 102 when the nozzle head 100 is in the actuated configuration. In some embodiments, the cap 108 falls into the room. In other embodiments, the cap 108 is coupled to the nozzle head 100 and falls below the surface 104 of the wall 106. The drop pipe 118 extends at a minimum distance into distribution piping 28 in this actuated configuration.

During actuation of the fire suppression system 10, the cavity 110 is provided with gas via the nozzle head 100. The gas may be provided from the agent tank 12 or from a separate source of gas. The gas fills the cavity 110 and exerts a force on the cap 108. The force exerted on the cap 108 (due to pressure from the gas) forces the cap 108 from the cover 102 when a threshold pressure within the cavity 110 is reached. Once the cap 108 has been forced from the cover 102 (i.e., when a threshold force on the cover 102 has been reached), the cavity 110 is open to the ambient environment to vent the gas and allows fluid communication between the nozzle head 100 and the room. In some embodiments, the drop pipe 118 moves relative to the distribution piping 28 during actuation. The nozzle head 100 can move relative to the distribution piping 28 once the cap 108 is forced from the cover 102 and can be disposed approximately 0-12 inches from the surface 104 in the actuated configuration. In some embodiments, the cap 108 may be forced from the cover 102 in response to a signal from a control panel (e.g., in communication with the controller 38, etc.). In other embodiments, the cap 108 is forced from the cover 102 in response to a force exerted by the nozzle head 100 on the cap 108. For example, the nozzle head 100 may move toward the cap 108 with enough force to push the cap 108 from the cover 102.

Figure 6:
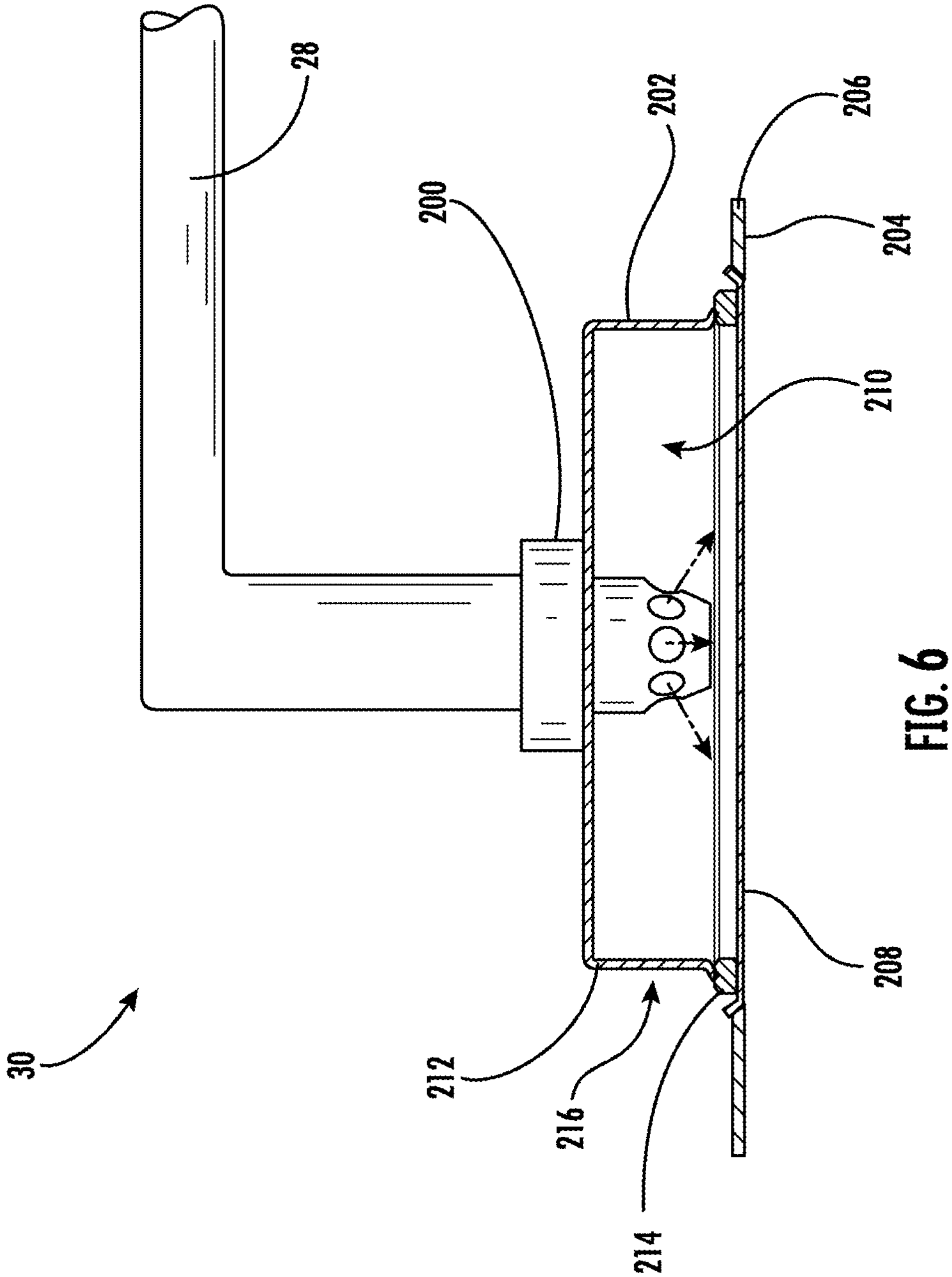
FIG. 6 is an illustration of a nozzle assembly in an unactuated configuration according to another exemplary embodiment.
Figure 7:
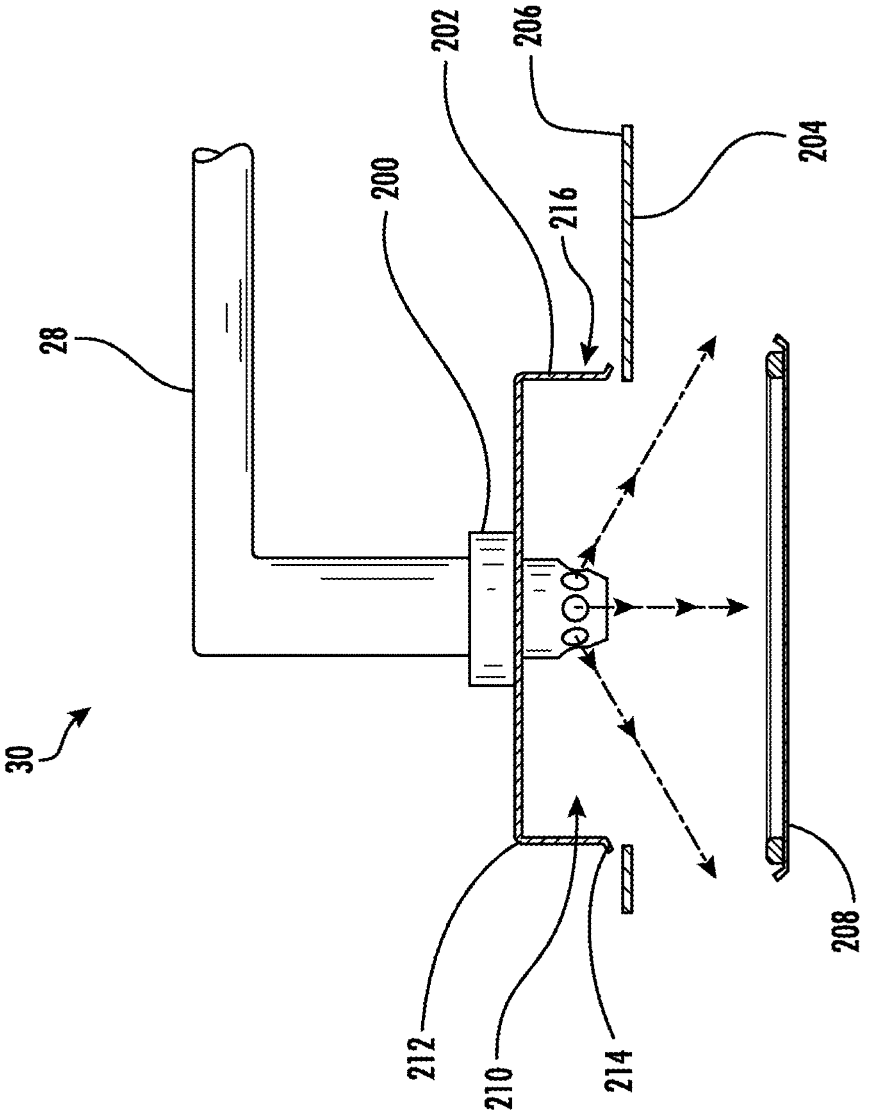
FIG. 7 is an illustration of the nozzle assembly of FIG. 6 in an actuated configuration according to an exemplary embodiment.

Referring to FIGS. 6 and 7, another embodiment of the nozzle assembly 30 is shown. As described above, the nozzle assembly 30 is configured to activate in response to activation of the fire suppression system 10. The nozzle assembly 30 includes a nozzle head 200 fluidly coupled to the distribution piping 28. The nozzle assembly 30 includes a cover 202 (e.g., a housing, etc.), positioned on or near a surface 204 of a wall 206 (e.g., a ceiling, a floor, etc. or other structure within a space (e.g., a room, etc.)). The nozzle assembly 30 also includes a cap 208 (e.g., a lid, etc.), which may selectively couple to the cover 202 and is positioned to define an outermost surface of the nozzle assembly 30. In an unactuated configuration, the nozzle head 200 is positioned behind the cap 208 and is not visible by users within the space. The cap 208 is coupled to the cover 202 in the unactuated configuration. A cavity 210 is defined between the nozzle head 200, the cover 202, and the cap 208. In an actuated configuration, the nozzle head 200 may be visible via the cavity 210, while remaining disposed behind the surface 204. In the actuated configuration, the cap 208 decouples from the cover 202 to allow fluid communication between the nozzle head 200 and an ambient environment. For example, once actuated, the nozzle head 200 releases a fire suppression agent (e.g., an inert gas, etc.) into the space (e.g., a room, etc.).

The cover 202 may be structured to extend behind the surface 204. The cover 202 includes an inlet end 212 and an outlet end 214. The inlet end 212 is positioned behind the surface 204 relative to the hazard area. The outlet end 214 is positioned in front of or in line with the surface 204, relative to the hazard area. An aperture 216, which is formed by the cover 202, is defined between the inlet end 717 and the outlet end 214. The aperture 216 may have a smaller diameter at the inlet end 212 than at the outlet end 214. The aperture 216 is sized to accept a portion of the nozzle head 200 at the inlet end 212 and create a fluid seal between the nozzle head 200 and the cover 202. In some examples, the nozzle head 200 extends partially into the cavity 210 via the aperture 216. The cap 208 is positioned at the outlet end 214 of the cover 202. The cap 208 has a diameter that is the same as or larger than a diameter of the aperture 216 at the outlet end 214 to limit fluid communication between the outlet end 214 and an ambient environment. The cap 208 may be coupled to the cover 202 via adhesive, pressure, snap fit, friction fit, or another method of coupling. The cavity 210 is defined on the outlet end 214 of the cover 202 by the cap 208 and the cover 202. The cavity 210 is defined on the inlet end 212 of the cover 202 by the cover 202, and the nozzle head 200. The cavity 210 can receive gas (e.g., actuation gas, fire suppression agent, etc.) from the nozzle head 200. The gas may be released from the agent tank 12 or from another source of gas.

In an unactuated configuration, the nozzle head 200 is covered by the cap 208 and the cover 202. The cavity 210 is defined by the cover 202, the cap 208, and the nozzle head 200. The nozzle head 200 extends partially into the cavity 210. The cavity 210 is fluidly sealed from an ambient environment (i.e., within the space) in the unactuated configuration.

In an actuated configuration, the nozzle head 200 is visible from the space as the cavity 210 is open to the ambient environment via the outlet end 214. Further, in the actuated configuration, the cap 208 is decoupled from the cover 202. In various embodiments, the cap 208 may fall into the room. When the cap 208 has decoupled from the cover 202, the nozzle head 200 may be in fluid communication with the room.

During actuation of the fire suppression system 10, the cavity 210 is provided with gas via the nozzle head 200. The gas may be provided from the agent tank 12 or from a separate source of gas. The gas fills the cavity 210 and exerts a force on the cap 208. The force exerted on the cap 208 (due to pressure from the gas) forces the cap 208 from the cover 202 when a threshold pressure within the cavity 210 is reached. Once the cap 208 has been forced from the cover 202 (i.e., when a threshold force on the cover 202 has been reached), the cavity 210 is open to the ambient environment to vent the gas via the outlet end 214, which allows fluid communication between the nozzle head 200 and the space. In some embodiments, the cap 108 may be forced from the cover 102 in response to a signal from a control panel (e.g., in communication with the controller 38, etc.). Accordingly, the nozzle head 200 becomes in fluid communication with the ambient environment within the space and disperses fire suppression agent into the space (i.e., directed to a hazard area). The nozzle head 200 remains positioned behind the surface 204.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the fire suppression system 10 as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

Additionally, any element disclosed in one embodiment may be incorporated or utilized with any other embodiment disclosed herein. For example, the drop pipe 118 may be included in the nozzle assembly 30 as depicted in FIGS. 6 and 7. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A nozzle assembly configured to selectively provide fire suppression agent to a space, comprising:
- a cover;
- a cap coupled to the cover to define a cavity;
- a nozzle head received within the cavity, the nozzle head being configured to provide the fire suppression agent to a hazard area, wherein the cap is coupled to the cover at a location which is below the nozzle head; and
- a pipe coupling assembly including an inner pipe portion and an outer pipe portion, wherein the outer pipe portion includes a flange that engages the inner pipe portion, wherein the flange is spaced from the cavity, and wherein the inner pipe portion is configured to slide relative to the outer pipe portion when the nozzle assembly is actuated;
- wherein the cap is disconnected from the cover and the nozzle head responsive to a pressure formed by release of the fire suppression agent by the nozzle head into the cavity exceeding a threshold pressure, the pressure acting directly on the cap.

2. The nozzle assembly of claim 1, wherein the nozzle head is in fluid communication with the hazard area after the cap is decoupled from the cover.

3. The nozzle assembly of claim 2, wherein the nozzle head is configured to release the fire suppression agent from within the cover.

4. The nozzle assembly of claim 1, wherein the nozzle head is positioned behind a surface relative to the cap and the cap is positioned in front of the surface.

5. The nozzle assembly of claim 1, wherein the fire suppression agent is an inert gas.

6. The nozzle assembly of claim 1, wherein the cap is coupled to the cover via at least one of an adhesive or a friction fitting.

7. A nozzle assembly configured to selectively provide fire suppression agent to a space, comprising:
- a pipe coupling assembly structured to change in length, the pipe coupling assembly including:
  - an outer pipe portion including a first flange; and
  - an inner pipe portion slidably coupled to the outer pipe portion and including a second flange, wherein at least one of (a) the first flange engages the inner pipe portion to form a first seal or (b) the second flange engages the outer pipe portion to form a second seal;
- a nozzle head coupled to the pipe coupling assembly;
- a cover; and
- a cap releasably coupled to the cover and defining a cavity therebetween, wherein the cap is movable from a first position in which the cap engages the cover to a second position in which the cap is spaced from the first position and disconnected from the cover and the nozzle head;
- wherein in an unactuated configuration, the nozzle head is received within the cavity and not visible from within the space; and
- wherein in an actuated configuration, the pipe coupling assembly increases in length and the nozzle head extends at least partially out from the cavity and is visible from within the space, and wherein engagement of the first flange and the second flange limits a range of movement of the inner pipe portion relative to the outer pipe portion.

8. The nozzle assembly of claim 7, wherein the outer pipe portion, the inner pipe portion, the first flange, and the second flange define a second cavity comprising a fluid configured to dampen movement of the inner pipe portion relative to the outer pipe portion upon release of the fire suppression agent from the nozzle head.

9. The nozzle assembly of claim 7, wherein the nozzle head is spaced approximately 0-12 inches from the cover in the actuated configuration.

10. The nozzle assembly of claim 7, wherein the nozzle head is positioned within the cavity and behind a surface in the unactuated configuration, and outside of the cavity and in front of the surface in the actuated configuration.

11. The nozzle assembly of claim 7, wherein the cap is released from the cover by force on the cap formed by a pressure within the cavity due to a release of the fire suppression agent.

12. The nozzle assembly of claim 7, wherein the cap is released from the cover by a force exerted on the cap due to movement of the nozzle head.

13. A method for releasing a fire suppression agent from a nozzle assembly into a space, comprising:
- coupling the nozzle assembly to a distribution piping, wherein the nozzle assembly comprises a nozzle, a cover, a cap, and a pipe coupling assembly, the pipe coupling assembly including an outer pipe portion coupled to the distribution piping, an inner pipe portion coupled to the nozzle, and a flange extending between the outer pipe portion and the inner pipe portion to form a seal;
- supplying a cavity defined between the cover and the cap with the fire suppression agent via the distribution piping;
- forming a pressure within the cavity due to introduction of the fire suppression agent;
- disconnecting the cap from the cover and the nozzle and moving the cap downward in response to the pressure exerting a threshold pressure directly on the cap;
- moving the nozzle out of the cavity to an actuated position below the cover; and
- releasing the fire suppression agent into the space via the nozzle while in the actuated position.

14. The nozzle assembly of claim 7, wherein the cap is spaced below the first position when in the second position, and wherein the nozzle head extends below the cavity in the actuated configuration.

15. The nozzle assembly of claim 7, wherein the cap is configured to move from the first position to the second position responsive to a pressure acting directly on the cap exceeding a threshold pressure.

16. The nozzle assembly of claim 7, wherein both (a) the first flange engages the inner pipe portion to form the first seal and (b) the second flange engage the outer pipe portion to form the second seal.

17. The nozzle assembly of claim 7, wherein the nozzle head is coupled to the inner pipe portion.

18. The method of claim 13, wherein the flange is a first flange and the seal is a first seal, and wherein the pipe coupling assembly further includes a second flange extending between the outer pipe portion and the inner pipe portion to form a second seal.

19. The method of claim 13, wherein the flange is fixedly coupled to the outer pipe portion.

20. The method of claim 13, wherein the flange is fixedly coupled to the inner pipe portion.

* * * * *